(12) United States Patent
Dzafic et al.

(10) Patent No.: US 7,517,208 B2
(45) Date of Patent: Apr. 14, 2009

(54) INJECTION MOLDING SYSTEM HAVING A COOPERATING TAPERED MACHINE NOZZLE AND BARREL HEAD

(75) Inventors: Svemir Dzafic, Mississauga (CA); Gregory Allan Schultz, Bolton (CA)

(73) Assignee: Husky Injection Molding Systems Ltd., Bolton, ON (CA)

( * ) Notice: Subject to any disclaimer, the term of this patent is extended or adjusted under 35 U.S.C. 154(b) by 247 days.

(21) Appl. No.: 11/548,808

(22) Filed: Oct. 12, 2006

(65) Prior Publication Data

US 2008/0089976 A1    Apr. 17, 2008

(51) Int. Cl.
*B29C 45/18* (2006.01)
(52) U.S. Cl. .................. 425/190; 425/191; 425/542
(58) Field of Classification Search .......... 425/542, 425/190, 191
See application file for complete search history.

(56) References Cited

U.S. PATENT DOCUMENTS 3,302,240 A * 2/1967 Diether ................. 425/190
4,099,905 A * 7/1978 Nash et al. ............. 425/542
4,464,104 A * 8/1984 Gneuss ................. 425/192 R
5,182,118 A    1/1993 Hehl
6,942,006 B2    9/2005 Kono
2005/0255189 A1    11/2005 Manda et al.

FOREIGN PATENT DOCUMENTS

WO        9500312        1/1995

* cited by examiner

*Primary Examiner*—Tim Heitbrink

(57) ABSTRACT

Molding system for use with a mold having stationary mold portion and movable mold portion, molding system comprising: stationary platen configured to support stationary mold portion; movable platen configured to be movable relative to stationary platen, and movable platen configured to support movable mold portion; and extruder, including: barrel defining channel extending through barrel; liner received in channel, liner defining first conically-shaped end; machine nozzle connecting with the mold; and barrel head fixedly connected with barrel, barrel head fixedly connected with machine nozzle so that molten molding material is conveyable from barrel to cavity defined by the mold, barrel head defining passageway extending through barrel head, barrel head defining second conically-shaped end exiting the passageway, second conically-shaped end mated with the first conically-shaped end of the liner so that channel and passageway are aligned with each other.

2 Claims, 3 Drawing Sheets

INJECTION MOLDING SYSTEM HAVING A COOPERATING TAPERED MACHINE NOZZLE AND BARREL HEAD

RELATED APPLICATIONS

Similar subject matter is discussed in the related applications entitled: (i) BARREL HEAD OF EXTRUDER OF MOLDING SYSTEM, BARREL HEAD HAVING OUTER AND INNER PORTIONS, AMONGST OTHER THINGS 11/548,919, and (ii) MOLDING SYSTEM INCLUDING BODY OVERLAPPING AND SEALING CONDUITS, AMONGST OTHER THINGS 11/548,740.

TECHNICAL FIELD

The present invention generally relates to, but is not limited to, molding systems, and more specifically the present invention relates to, but is not limited to, (i) a component of a molding system, including a first conduit having a conically-shaped first-conduit distal end being matable with a conically-shaped second-conduit distal end of a second conduit of the molding system, (ii) a molding system, including the first conduit and the second conduit, (iii) a molding system, including a barrel having a conically-shaped first-conduit distal end, and a barrel head having a conically-shaped second-conduit distal end being matable with the conically-shaped first-conduit distal end, and (iv) an extruder, including a barrel having a conically-shaped first-conduit distal end, and a barrel head having a conically-shaped second-conduit distal end being matable with the conically-shaped first-conduit distal end, amongst other things.

BACKGROUND

Examples of known molding systems are (amongst others): (i) the HyPET™ Molding System, (ii) the Quadloc™ Molding System, (iii) the Hylectric™ Molding System, and (iv) the HyMet™ Molding System, all manufactured by Husky Injection Molding Systems Limited (Location: Bolton, Ontario, Canada).

U.S. Pat. No. 5,182,118 (Inventor: Hehl; Published: 1993 Jan. 26) discloses a plasticising unit for injection molding machine that has two part barrel design where joint line between them always lies in low pressure zone behind non-return valve at front of screw. More specifically, this patent discloses that in the plasticizing cylinder the plasticized plastic material is transported by a rotating feed screw into a space which is in front of the feed screw and the plastic material is subsequently injected into the injection mold of the injection molding machine by an axial discharge stroke of the feed screw. During that stroke a backflow-preventing valve is effective to seal a high-pressure space from a low-pressure space, which contains the feed screw. The plasticizing cylinder is composed of a cylinder head, which always completely encloses the high-pressure space and the backflow-preventing valve, and a cylinder shank, which encloses the low-pressure space and the feed screw. Even when the feed screw is in its rearmost initial position will the high-pressure space not be adjoined by a joint which leads to the outside of the plasticizing cylinder so that the problems previously encountered in connection with the sealing of the high-pressure space are avoided.

World Intellectual Property Organization Patent Number WO 9500312 (Inventor: WOLFF; Published: 1995 Jan. 5) discloses a hot runner distributor for supplying molten thermoplastic materials to hot nozzles at molding tools that has pipe plug-type connections that allow thermal expansion. Each pipe plug-type connection has two mutually aligned pipe ends which surround the runner of molten material and are mutually separated by an expandable joint. Both pipe ends are enclosed in the area of the expandable joint by a common cooling ring. The molten plastic material which solidifies under the action of the cooling ring seals the pipe plug-type connection in the area of the expandable joint.

U.S. Pat. No. 6,942,006 (Inventor: KONO; Published: 13 Sep. 2005) discloses a metal injection molding apparatus with features which reduce the amount of metal which enters a drive mechanism of the apparatus. The apparatus contains an injection chamber having an accumulation portion and a shaft housing portion. The shaft housing may extend all the way to the position of an injection member in a fully retracted position. The accumulation portion and the shaft housing may comprise different vessels attached to each other with an insulating gasket provided therebetween. The insulator material of the gasket is preferably made of asbestos, a heat insulating ceramic or any other suitable heat resistant material. The material to be injected, such as a liquid or thixotropic metal, enters the injection chamber through an entry opening configured in the accumulation portion, and exits the accumulation portion, when injected, through a nozzle aperture configured at an end of the accumulation portion and into the mold. The shaft housing portion may include openings in the sidewalls through which any melt leakage past from the injection member that has not been caught by a series of piston rings may egress. Accordingly, the shaft housing, and gasket, is not configured to experience pressurized melt of molding material.

U.S. published patent application No. 2005/0255189 (Inventor: MANDA, Jan; et al; Published: 17 Nov. 2005) discloses a cooled connection between melt conduits of a runner system to form a seal of at least partially solidified molding material (a metallic molding material). Discloses is a seal in the metal molding system, such as those between melt conduit components of a barrel assembly and a runner system. U.S. Pat. No. 2005/0255189 discloses a cooled interface for providing a seal of at least partially solidified molding material between the components of the runner system. A problem with the cooled interface may occur when the amount of heat required to be removed to effect the seal of at least partially solidified molding material is also sufficient to over-cool an adjacent portion of a melt passageway and cause a plug of at least partially solidified molding material to form therein which may affect the proper flow of the molding material therethrough. Others have relied on face seals across a clamped interface between mating faces of adjacent melt conduits. In practice, the mating faces of the melt conduits that form the interface do not adequately conform to one another to affect a reliable seal against the leakage of the generally low viscosity molding material under the injection pressure.

SUMMARY

According to a first aspect of the present invention, there is provided a component of a molding system, including, amongst other things: a first conduit having a conically-shaped first-conduit distal end being matable with a conically-shaped second-conduit distal end of a second conduit of the molding system.

According to a second aspect of the present invention, there is provided a molding system, including, amongst other things: (i) a first conduit having a conically-shaped first-conduit distal end, and (ii) a second conduit having a conically-shaped second-conduit distal end being matable with the conically-shaped first-conduit distal end. According to a third aspect of the present invention, there is provided a molding system, including, amongst other things: a stationary platen configured to support a stationary mold portion of a mold, a movable platen configured to be movable relative to the stationary platen and configured to support a movable mold portion of the mold, and an extruder, including: (i) a first conduit having a first conically-shaped end, and (ii) a second conduit having a second conically-shaped end being matable with the first conically-shaped end.

According to a fourth aspect of the present invention, there is provided an extruder, an extruder, including, amongst other things: (i) a first conduit having a first conically-shaped end, and (ii) a second conduit having a second conically-shaped end being matable with the first conically-shaped end.

According to a fifth aspect of the present invention, there is provided a hot runner, including (amongst other things): a first conduit having a first conically-shaped end, and a second conduit having a second conically-shaped end being matable with the first conically-shaped end.

According to a sixth aspect of the present invention, there is provided a method, including (amongst other things) shaping a first conduit of a molding system, the first conduit having a first conically-shaped end being matable with a second conically-shaped end of a second conduit of the molding system.

A technical effect, amongst other technical effects, of the aspects of the present invention is a reduction, at least in part, in leakage of a molding material from conduits of a molding system.

BRIEF DESCRIPTION OF THE DRAWINGS

A better understanding of the exemplary embodiments of the present invention (including alternatives and/or variations thereof) may be obtained with reference to the detailed description of the exemplary embodiments of the present invention along with the following drawings, in which.

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

DETAILED DESCRIPTION OF THE EXEMPLARY EMBODIMENTS

Figure 1:
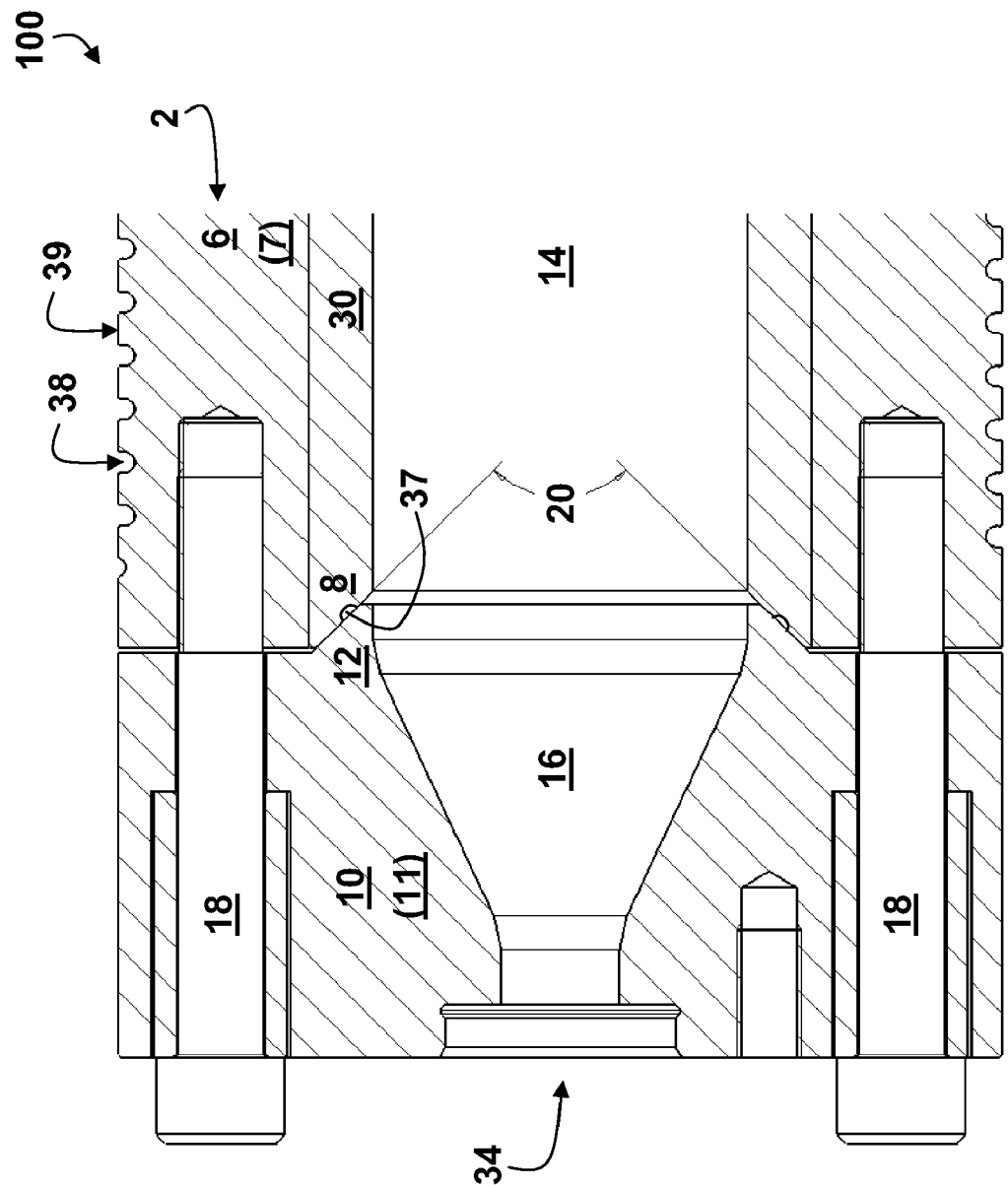
FIG. 1 is a cross-sectional view of a component of a molding system according to the first exemplary embodiment (which the preferred embodiment)

FIG. 1 is a cross-sectional view of a component 2 of a molding system 100 (depicted in part, and hereafter referred to as the "system 100") according to the first exemplary embodiment. The component 2 includes, amongst other things, a first conduit 6 that has a conically-shaped end 8 (at least partially conically shaped; hereafter referred to as the "end 8"). The end 8 is matable with a conically-shaped end 12 (hereafter referred to as the "end 12") of a second conduit 10 of the system 100.

Preferably, the first conduit 6 includes a barrel 7, and/or the second conduit 10 includes a barrel head 11. The first conduit 6 defines a (preferably, central) channel 14 that extends through the first conduit 6. The second conduit 10 defines a (preferably, central) passageway 16 that extends through the second conduit 10. The ends 8, 12 include a frustum-shaped distal end that is a frustum of a right circular cone. The ends 8, 12 include a chamfered surface and/or a beveled surface. The first conduit 6 is attachable to the second conduit 10, preferably by way of bolts 18.

The channel 14, of the conduit 6, extends through the conduit 6 and is, preferably, cylindrical. The conduit 6 forms a chamfer at the end of the channel 14. The chamfer is also called a conical seat. Preferably, the first conically-shaped end 8 and the second conically-shaped end 12 are directly contactable with each other.

Figure 3:
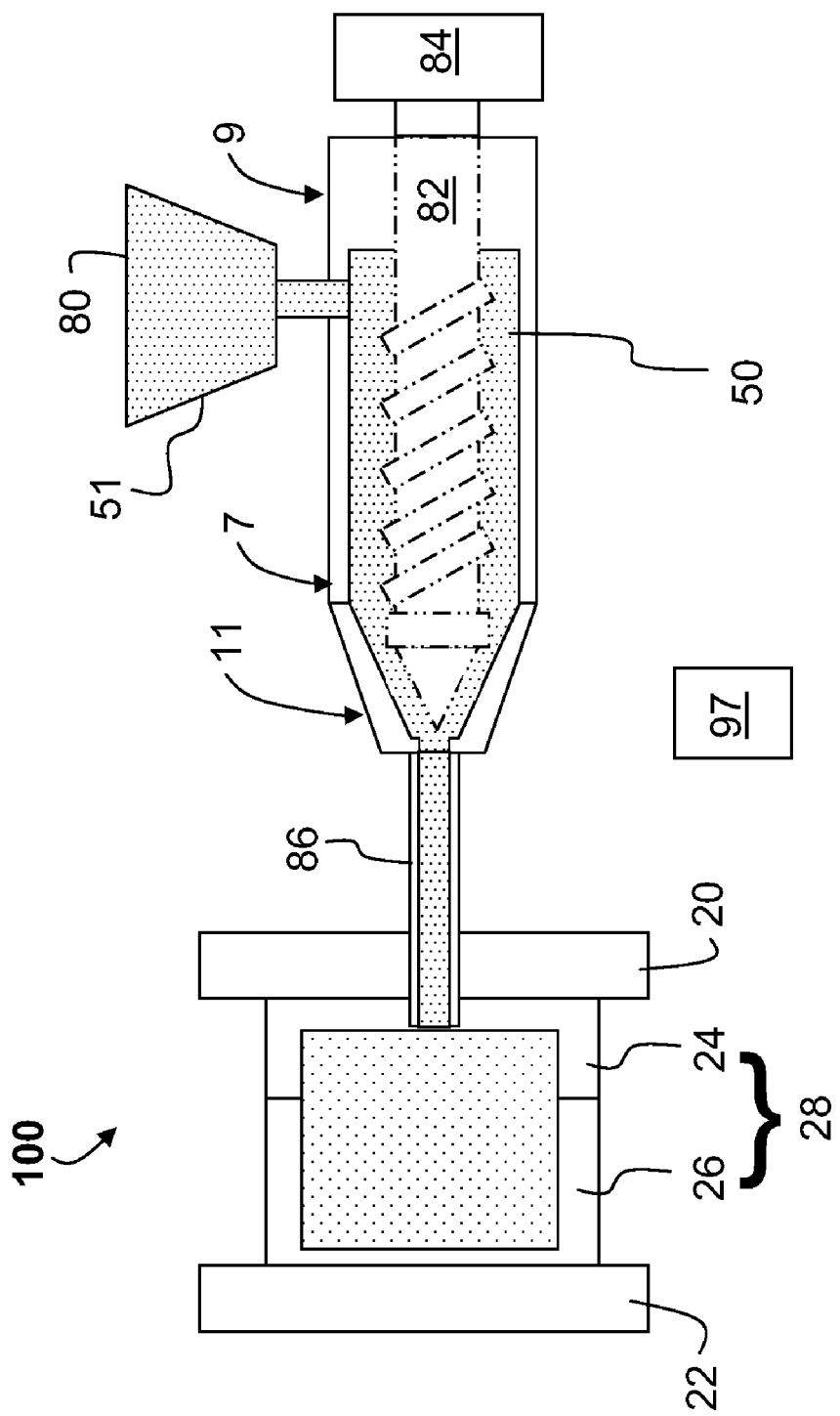
FIG. 3 is a schematic representation of a molding system and of an extruder having the component 2 and/or 3 of FIGS. 1 and/or 2A and 2B, respectively.

The barrel head 11 has an egress end 34 that is connectable to a machine nozzle (not depicted), and the machine nozzle is either connected to a mold 28 (depicted in FIG. 3) or to a hot runner 97 (depicted in FIG. 3). If the system 100 is used to mold a metallic molding material, then a liner 30 is inserted into the barrel 7. The liner 30 is, preferably, made of Stellite™ supplied by the Deloro Stellite Company located in Goshen, Ind., USA. The barrel 7 is made of Inconel™ supplied by the Special Metals Corporation located in Huntington, W.V., USA. A groove 38 is formed on an outer surface 39 of the barrel 7, and the groove 38 receives a heating wire (not depicted); alternatively, a heading band is coupled to the outer surface 39 and the groove 38 is not used.

The system 100, preferably, is a metal molding system that is used to process a metallic molding material, such as an alloy of magnesium, zinc, aluminum, etc.

Preferably, the first conduit 6 defines a groove 37 located on a conical surface of the first conduit 6 (or alternatively the second conduit 10). The groove 37 permits a smaller area at the interface which then permits higher contact pressures at the interface between the conduits 6, 10.

Figure 2B:
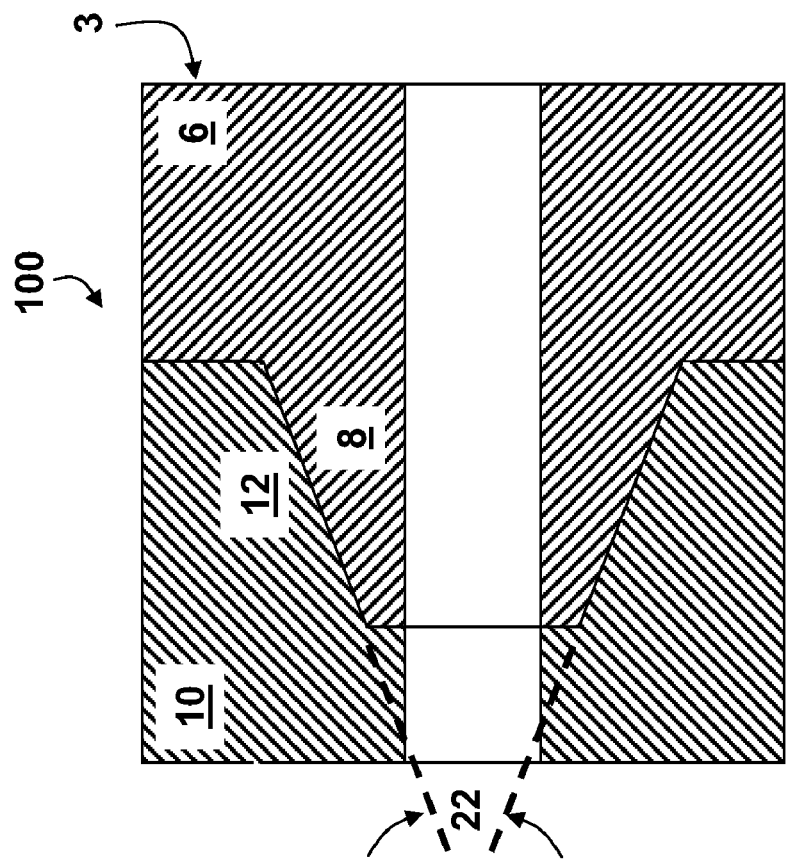
FIGS. 2A and 2B are a cross-sectional views of the component of FIG. 1 and of a component of a molding system according to a second exemplary embodiment, respectively.
Figure 2A:
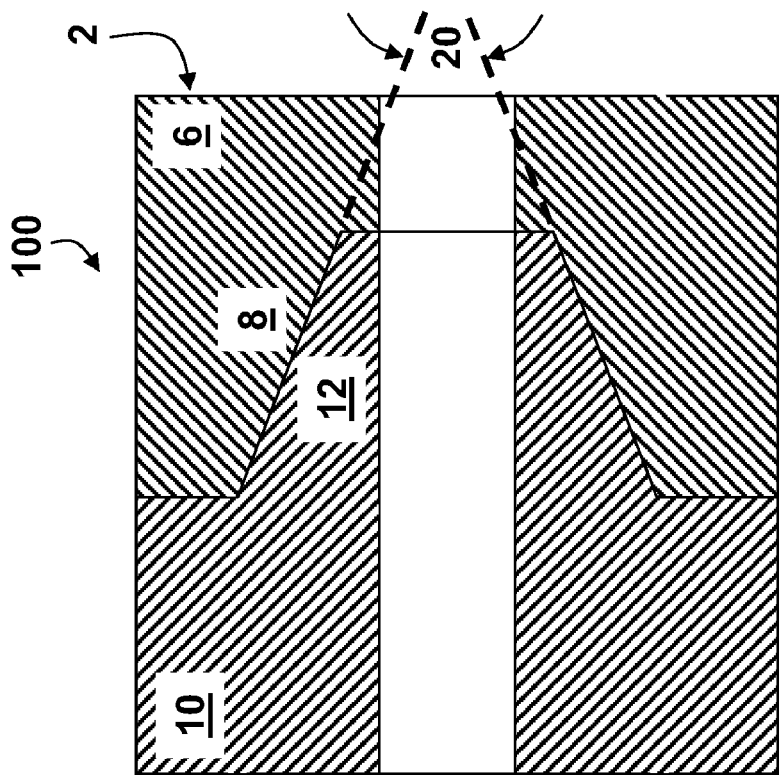

FIGS. 2A and 2B are cross-sectional views of the component 2 and of a component 3 both of which are usable in the system 100, respectively. The component 3 is in accordance with the second exemplary embodiment. To facilitate an understanding of the second exemplary embodiment, elements of the second exemplary embodiment (that are similar to those of the first exemplary embodiment) are identified by similar reference numerals. Preferably, the end 8 defines an apex angle 22 that ranges from about 40 degrees to about 90 degrees. Preferably, the apex angle 22 is about 70 degrees. The end 12 defines an apex angle 20 ranging from about 40 degrees to about 90 degrees. Preferably, the apex angle 20 is about 70 degrees.

According to component 2, the end 8 extends inwardly (from the conduit 6) and the end 12 extends outwardly or away from (from the conduit 10). According to component 3, the end 8 extends outwardly or away from (from the conduit 6) and end 12 extends inwardly (from the conduit 10).

The system 100 includes, amongst other things: (i) the first conduit 6 that has the end 8, and (ii) the second conduit 10 that has the end 12 that is matable with the end 8.

FIG. 3 is a schematic representation of the system 100 and of an extruder 9 having the component 2 and/or 3 (depicted as the barrel head and as the barrel of the extruder) of FIGS. 1 and/or 2A and/or 2B, respectively. Preferably, the system 100 includes amongst other things: (i) a stationary platen 20 that is configured to support a stationary mold portion 24 of a mold 28, (ii) a movable platen 22 that is configured to be movable relative to the stationary platen 20; the movable platen 22 is configured to support a movable mold portion 26 of the mold 28, and (iii) an extruder 9. The extruder 9 includes, amongst other things: (i) the barrel 7 that has the end 8, and (ii) the barrel head 11 that has the end 12 that is matable with the end 8. The extruder 9 may be sold and supplied separately from the system 100. A hopper 80 is attached to a feed throat of the extruder 9 and is used to feed pellets of a moldable molding material 51 to the extruder 9. A screw 82 is disposed in the extruder 9, and the screw 82 is connected to a screw drive 84. The screw drive 84 drives the screw 82, and the screw 82 in turn processes (heats, etc) the material 51 and converts the material 51 into the (molten) molding material 50. A machine nozzle 86 connects the extruder 9 to the mold 28 so that the molten molding material 50 may be conveyed from the extruder 9 to the cavity defined by the mold 28.

Preferably, the system 100 further includes, amongst other things, tangible subsystems, components, sub-assemblies, etc, that are known to persons skilled in the art (these items are not depicted and not described in detail since they are known). These other things may include: (i) a hot runner 97 (used if required) that is mounted to the stationary platen 20 and the stationary mold portion 24 is then mounted to the hot runner 97 instead of being mounted to the stationary platen 20, (ii) tie bars (not depicted) that operatively couple the platens 20, 22 together, (iii) a clamping mechanism (not depicted) coupled to the tie bars and used to generate a clamping force that is transmitted to the platens 20, 22 via the tie bars (so that the mold 28 may be forced to remain together while a (molten) molding material 50 is being injected in to the mold 28), (iv) a mold break force actuator (not depicted) coupled to the tie bars and used to generate a mold break force that is transmitted to the platens 20, 22 via the tie bars (so as to break apart the mold 28 once an article has been molded in the mold 28), (v) a platen stroking actuator (not depicted) coupled to the movable platen 22 and used to move the movable platen 22 away from the stationary platen 20 so that the molded article may be removed from the mold 28, (vi) hydraulic and/or electrical control equipment, and (vii) a controller (not depicted) that is operatively coupled to the system 100 so as to control and coordinate the processes associated with the system 100.

The description of the exemplary embodiments provides examples of the present invention, and these examples do not limit the scope of the present invention. It is understood that the scope of the present invention is limited by the claims. The exemplary embodiments described above may be adapted for specific conditions and/or functions, and may be further extended to a variety of other applications that are within the scope of the present invention. Having thus described the exemplary embodiments, it will be apparent that modifications and enhancements are possible without departing from the concepts as described. It is to be understood that the exemplary embodiments illustrate the aspects of the invention. Reference herein to details of the illustrated embodiments is not intended to limit the scope of the claims. The claims themselves recite those features regarded as essential to the present invention. Preferable embodiments of the present invention are subject of the dependent claims. Therefore, what is to be protected by way of letters patent are limited only by the scope of the following claims:

What is claimed is:

1. A molding system for use with a mold having a stationary mold portion and a movable mold portion, the molding system comprising:
    a stationary platen being configured to support the stationary mold portion of the mold;
    a movable platen being configured to be movable relative to the stationary platen, and the movable platen being configured to support the movable mold portion of the mold; and
    an extruder, including:
        a barrel defining a channel extending through the barrel;
        a liner being received in the channel of the barrel, the liner defining a first conically-shaped end;
        a machine nozzle being configured to connect with the mold; and
        a barrel head being fixedly connected with the barrel, the barrel head being fixedly connected with the machine nozzle so that a molten molding material is conveyable from the barrel to a cavity defined by the mold, the barrel head defining a passageway extending through the barrel head, the barrel head defining a second conically-shaped end exiting the passageway, the second conically-shaped end being mated with the first conically-shaped end of the liner so that the channel and the passageway are aligned with each other,
    wherein the first conically-shaped end extends inwardly, and the second conically-shaped end extends outwardly.

2. An extruder for use with a molding system, the molding system for use with a mold having a stationary mold portion and a movable mold portion, the molding system including: (i) a stationary platen being configured to support the stationary mold portion of the mold, (ii) a movable platen being configured to be movable relative to the stationary platen, and the movable platen being configured to support the movable mold portion of the mold, the extruder, comprising:
    a barrel defining a channel extending through the barrel;
    a liner being received in the channel of the barrel, the liner defining a first conically-shaped end;
    a machine nozzle being configured to connect with the mold; and
    a barrel head being fixedly connected with the barrel, the barrel head being fixedly connected with the machine nozzle so that a molten molding material is conveyable from the barrel to a cavity defined by the mold, the barrel head defining a passageway extending through the barrel head, the barrel head defining a second conically-shaped end exiting the passageway, the second conically-shaped end being mated with the first conically-shaped end of the liner so that the channel and the passageway are aligned with each other,
    wherein the first conically-shaped end extends inwardly, and the second conically-shaped end extends outwardly.

* * * * *